United States Patent [19]

Lummen

[11] 4,299,094
[45] Nov. 10, 1981

[54] CONTROLLER FOR A VEHICULAR AIR CONDITIONER

[76] Inventor: Chester F. Lummen, 5017 Waterbury Way, Fair Oaks, Calif. 95628

[21] Appl. No.: 129,104

[22] Filed: Mar. 10, 1980

[51] Int. Cl.³ .................. B60H 3/04; H01H 29/28
[52] U.S. Cl. ............................. 62/133; 62/323.4; 200/81.6
[58] Field of Search ............. 62/323 C, 133; 200/33 A, 81.6

[56] References Cited

U.S. PATENT DOCUMENTS 2,314,268 3/1943 Bushnell .................. 200/81.6 X
3,462,964 8/1969 Haroldson ..................... 62/133

FOREIGN PATENT DOCUMENTS 137724 1/1920 United Kingdom ............ 200/81.6

Primary Examiner—William E. Wayner
Attorney, Agent, or Firm—Lothrop & West

[57] ABSTRACT

An air conditioner in a vehicle is driven by the vehicle engine through an electrically controlled clutch. An upright, miniaturized mercury U-tube is mounted on the vehicle with the legs of the U-tube in upright position. Electrical contacts positioned in one of the legs are variously washed by the mercury depending upon the workload placed upon the engine. The contacts are in circuit through the mercury with the vehicle battery and the clutch. Driving of the air conditioner is automatically and temporarily interrupted when more engine power is needed. Several contacts may be used to afford a selection of levels of sensitivity. Acceleration disconnects the air conditioner compressor. Deceleration, idling and consistent driving speed permits the air conditioner compressor to operate normally.

5 Claims, 1 Drawing Figure

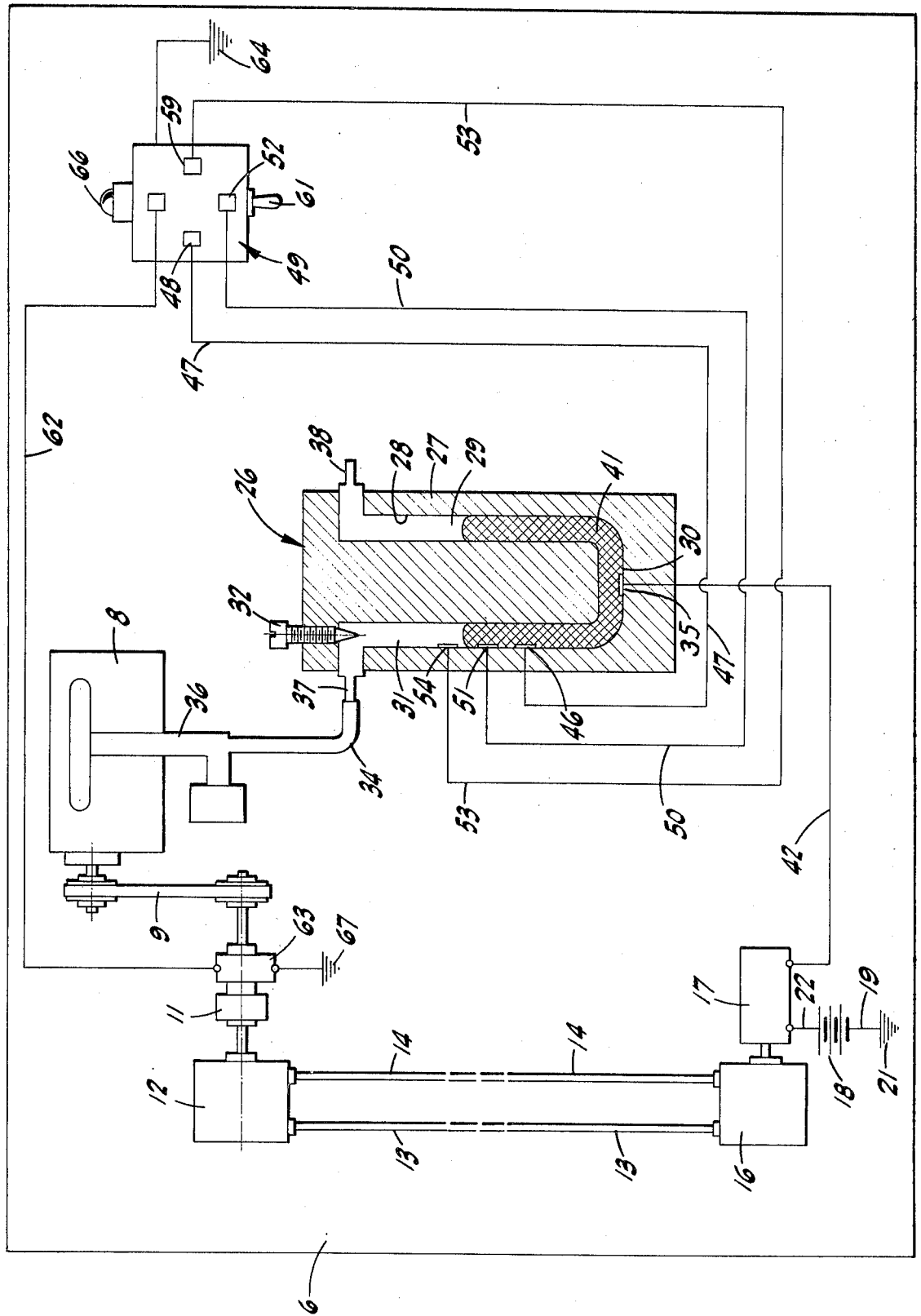

CONTROLLER FOR A VEHICULAR AIR CONDITIONER

BACKGROUND OF THE INVENTION

It has long been recognized that despite the comfort provided by an air conditioner in an automobile, a considerable amount of power is required to operate the compressor, power which could be used most advantageously during acceleration and during periods of engine power demand, such as starting from a stop, passing another vehicle and climbing hills.

The patent literature and the market place are not lacking in air conditioner control means responsive to vehicle engine power demands.

An example of the former is Haroldson U.S. Pat. No. 3,462,964 in which a diaphragm is utilized to sense the intake manifold pressure of an engine and operate a switch which, in turn, connects or disconnects the air conditioner from the engine in dependence upon the intake manifold pressure.

The inevitable fatigue and rupture inherent in diaphragm design as well as the difficulty of maintaining a seal over a period of extended use makes it desirable to achieve the economy of diaphragm construction while overcoming its disadvantages.

By substituting a miniaturized mercury U-tube for the diaphragm the shortcomings of the diaphragm type of sensing means are avoided and in one device both sensing and switching capabilities are afforded. Long life and reliability are thereby assured.

Grossman & Wynn, Jr., U.S. Pat. No. 1,078,785 discloses an automatic rheostat in which a mercury U-tube includes successive contacts in a vertical series. However, in this patent, an external resistance is in shunt relation with the contacts and as the mercury level rises through the contacts the current is shunted through the liquid. The device is aptly characterized as a rheostat and is therefore distinguishable from the present invention.

In addition, the throttling effect of the porous plug and adjustment screw in the present device enables the U-tube to be miniaturized while retaining sensitivity and accuracy. Adjustability to various road and load conditions while the car is in motion as well as the provision of an indicator lamp to alert the driver to make the appropriate adjustment before the comfort level of the passenger compartment deteriorates are still further features which, so far as known to applicant, are unique.

It is an object of the invention to provide an air conditioner controller which reduces the load on the engine when most power is needed to move the vehicle.

It is another object of the invention to provide an air conditioner controller which reduces the load on the starter and the battery by declutching the air conditioner compressor during starting and when the car is accelerating, passing another vehicle or climbing hills.

It is a further object of the invention to provide an air conditioner controller in which the compressor operates normally when the vehicle is being driven at a constant speed on level roads or when the vehicle is decelerating, thus using kinetic energy to cool the passenger compartment, or when the engine is idling.

It is yet another object of the invention to provide a generally improved air conditioner controller for vehicles.

Other objects, together with the foregoing are attained in the device shown in the accompanying drawing and disclosed in the subsequent detailed description.

SUMMARY OF THE INVENTION

A controller for an air conditioner installed on a vehicle and driven by the vehicle engine through a clutch includes an electrical solenoid for actuating the clutch, an electrical switch for opening and closing electrical contacts, and an electrical circuit connecting the switch, the electrical solenoid and an electrical battery so that the air conditioner clutch is disconnected when certain road and engine load conditions occur.

BRIEF DESCRIPTION OF THE DRAWING

The FIGURE is a diagram showing a vehicle with the air conditioner and controller arrangement installed thereon.

DESCRIPTION OF THE PREFERRED EMBODIMENT

A typical installation of the present arrangement is on a vehicle 6, shown diagrammatically.

The vehicle itself is generally standard, and only certain portions of interest in connection with the present mechanism are disclosed in the drawing. There is a main driving engine 8. This not only propels the vehicle in the customary fashion, but likewise through an appropriate connection 9 and clutch mechanism 11 operates an air conditioning compressor 12 of the usual sort arranged in the usual way. There are refrigerant lines 13 and 14 going to the air conditioning heat exchanger 16 suitably disposed in the vehicle and under the general control of a thermostat and switch 17 in the regular way. The vehicle includes the customary electrical system, of the single-wire grounded type, leading from a battery 18 through appropriate connections. One of the battery connections 19 is to a ground 21, while there is a battery lead 22 to the thermostat 17 and from the thermostat to a combined sensing means and switch 26 for controlling the air conditioner compressor 12.

At an appropriate point on the vehicle, preferably on the fire wall in the engine compartment, the controlling switch 26 is installed. The switch includes a plate-like body 27, suitably of plastic or other non-conductive material, provided with a U-shaped cavity 28 having a pair of legs 29 and 31 joined by a substantially horizontal portion 30 extending parallel to each other and disposed vertically upon installation.

An adjusting screw 32 in the upper end of the leg 31 serves as a bleed valve and permits fine adjustments to be made in the column of mercury in leg 31 by leaking, or bleeding, in a small amount of atmospheric air.

The upper portion of the leg 31 is connected by a vacuum line 34 to the intake manifold 36 of the engine 8. By this means, the pressure within the leg 31 can be reduced below its atmospheric value.

The bleed valve 32 serves in conjunction with a restriction 37 in the line 34 near the upper portion of the leg 31 to reduce the intake manifold vacuum, normally between 14 and 22 inches of mercury to a more manageable level of 2 to 4 inches in the control switch 26 without altering its sensitivity or responsiveness to changes in the operating condition of the engine. The restriction preferably is a porous plug; that is, a body having a number of tiny passages through it, and can be of porous wood, fiber or ceramic material.

The other U-tube leg 29 is connected to the atmosphere through a threaded opening 38, which is normally fitted with a screw, during shipment, to prevent the mercury from leaking out.

The pressures between the legs 29 and 31 are related to each other because there is a body of mercury 41 in the tube and occupying, under static conditions, substantially the same level a large way up each of the tubes.

Particularly pursuant to the invention, there is an electrical conductor 42 extending from the thermostat switch 17 to an electrical contact 35 located in a lower portion of the mercury body 41 as shown. As will be appreciated, the contact 35 could, with equal facility, be located a short distance below the contact 46.

Within the tube and particularly in the leg 31, there is provided, in addition to the contact 35 a plurality of other electrical contacts. For example, from a contact 46 in the leg 31 a lead 47 goes to a terminal 48 in a selector switch 49. A similar connector 50 goes from the somewhat higher contact 51 in the leg 31 to a terminal 52 in the selector switch, while a third lead 53 goes from a still higher contact 54 in the leg 31 to a terminal 59 on the selector switch. The selector switch for selection has a hand controller 61 and is joined by a connector 62 to a magnetic or solenoid actuator 63 controlling the clutch 11. The selector switch has a ground connector 64 and an indicator light 66, while the actuator 63 has a connection 67 to ground.

With this arrangement, the selector switch 61 is left in a chosen position, so that any one of the leads 47, 50, or 53 is connected through the switch 61 to the connector 62 to the clutch actuator 63. The particular lead is selected by the driver dependent upon the operating conditions which prevail. Since the various leads go to openings in the tube leg 31 at different heights therein, the position of the selector switch 61 controls which of the three leads 47, 50 or 53 is temporarily effective or ineffective.

The air conditioner circuit is from the battery ground 21 through the battery 18, the air conditioner thermostat 17, the lead 42 and through the electrical connection 35 in to the body 41 of mercury. The circuit is then to whichever one or more of the leads 47, 50 and 53 the mercury happens to contact, and not through any lead not in contact with the mercury. The so energized wire or wires then, if also selected by the selector switch 61, conducts through the lead 62 to the solenoid 63 controlling the clutch 11 and to ground 67. The clutch is correspondingly engaged and the air conditioning compressor 12 is driven by the engine 8. This then renders the air conditioning heat absorbing unit 16 effective.

As long as the vehicle operates steadily on a level path, that condition obtains. However, should the engine being to "lug" as when climbing a hill, or the driver suddenly applies pressure on the accelerator pedal to pass a car or to move ahead from a stop the intake manifold vacuum decreases (i.e. the pressure in the intake manifold increases toward atmospheric pressure). Thus, should one of these events occur, the mercury body 41 shifts in the U-tube, rising higher in the leg 29 and dropping lower in the leg 31. That means that the uppermost or third lead 53, for example, no longer conducts. If the lead 53 is the one chosen by the selector switch 49, the circuit is then broken. While the operator has a chance to move the selector switch 61 accordingly, if he does not do so, then the circuit has been interrupted and the air conditioner clutch 11 is disengaged because its solenoid actuator 63 is correspondingly deenergized. The engine 8 therefore no longer must operate the compressor 12, and that power is available for climbing the hill. The operator's use of the selector switch hand controller 61 may make none or any one of the conductors 47, 50 and 53 effective.

After the hill has been climbed or the passing maneuver completed or normal driving conditions and speed have been resumed, the intake manifold vacuum will return to its customary considerable amount. The mercury will then rise in the leg 31 and the air conditioner compressor will resume operation.

If a great deal of high speed driving or mountainous driving is encountered, the driver may prefer to move the selector switch 49 to a setting such as to connect the lead 62 to contacts which are lower in leg 31 such as contact 51 or 46. This makes the mechanism less sensitive to variations in engine operating conditions, reduced intake manifold vacuum and lower levels of mercury in leg 31, but still provides for short term disconnection of the air conditioner compressor when an extra burst of power is needed to pass another vehicle or to climb a very steep grade. In other words, where fairly frequent extra power demands are expected, the driver may wish to position the hand controller 61 such as to connect the lead 62 to terminal 52 or 48.

It can therefore be seen that full driving power is always available to the vehicle on demand of the driver since the air conditioner is automatically disconnected at preselected levels in accordance with the driver's positioning of the hand controller 61.

When the controller 61 is moved to "off" position, the power supply to connector 62 and solenoid actuator 63 is disconnected, thereby inactivating the clutch 11 so that the air conditioner runs continuously without interruption. This mode would be best suited to normal, steady driving on a level highway, for example.

Where an undulatory terrain is encountered, or occasional passing or around town start-and-stop driving is anticipated, the controller 61 can be moved so as to connect terminal 59 to the lead 62. For conditions in which frequent high power demands may be required, the hand controller may be positioned to connect lead 62 with either terminal 52 or 48, as previously explained.

During all times the air conditioner is operating the indicator lamp 66 is "on". Thus, when the exigencies of the situation require an extra power burst the indicator lamp 66 will go "off" as the air conditioner compressor is automatically disconnected. When, in the driver's opinion, the lamp 66 goes "off" too frequently, the controller 61 can be repositioned so that the device is less "sensitive" as previously explained, thereby anticipating and preventing an uncomfortable temperature buildup in the passenger compartment.

I claim:

1. In a vehicle having a propelling engine with an intake manifold and driving an air conditioner:
   a. an electrically controlled clutch for coupling and uncoupling the propelling engine and the air conditioner;
   b. an electrical switch for controlling said clutch, said switch including a U-tube having first and second legs disposed in a common, upright plane;
   c. means for mounting said U-tube on said vehicle with said plane in upright attitude;
   d. a mercury body in both legs of said U-tube;

e. first and second electrical connections available to said mercury body,
one of said electrical connections having a plurality of leads going to vertically spaced contacts available to said mercury body therein, said one of said electrical connections including a plurality ot terminals connected to said clutch and a selector switch including means for connecting any selected one of said contacts with any selected one of said terminals;
the other of said electrical connections having a lead extending from a power supply to a contact available to said mercury body; and,
f. means for making said electrical connections effective on said electrically controlled clutch.

2. A device as in claim 1 further including an indicator lamp connected to said selector switch for denoting whether the air conditioner is "on" or "off".

3. In a vehicle having a propelling engine with an intake manifold and driving an air conditioner:
a. an electrically controlled clutch for coupling and uncoupling the propelling engine and the air conditioner;
b. an electrical switch for controlling said clutch, said switch including a U-tube having first and second legs disposed in a common, upright plane;
c. means for mounting said U-tube on said vehicle with said plane in vertical attitude;
d. a mercury body in both legs of said U-tube;
e. means for connecting said first of said legs to said intake manifold;
f. means for connecting said second of said legs to the atmosphere;
g. means for at least partially restricting said connecting means to said first of said legs to reduce the extent of the range of pressures in said intake manifold,
said restricting means being a plug of porous fibrous material;
h. a bleed valve located in said first of said legs and spaced above said mercury body to permit the introduction of a small amount of atmospheric air;
i. first and second electrical connections available to said mercury body; and,
j. means for making said electrical connections effective on said electrically controlled clutch.

4. In a vehicle having a propelling engine with an intake manifold and driving an air conditioner:
a. an electrically closed clutch for coupling and uncoupling the air conditioner;
b. an electrical switch for controlling said clutch, said switch including a U-tube having first and second legs disposed in a common upright plane;
c. means for mounting said U-tube on said vehicle with said plane in vertical attitude;
d. a mercury body in both legs of said U-tube;
e. first and second electrical connections available to said mercury body;
f. means for making said electrical connections effective on said electrically controlled switch;
g. means for connecting said first of said legs to said intake manifold;
h. means for connecting said second of said legs to the atmosphere; and,
i. means for selectively restricting said first of said legs to reduce the extent of the intake manifold vacuum acting on the surface of the mercury body in said first of said legs.

5. A device as in claim 4 in which said restricting means is a porous plug and in which said device includes a bleed valve located in said first of said legs and spaced above the subjacent surface of said mercury body to permit the introduction of a small amount of atmospheric air.

* * * * *